Patented Mar. 10, 1936

2,033,131

UNITED STATES PATENT OFFICE 2,033,131

REACTION PRODUCT AND PROCESS OF MAKING SAME

Carleton Ellis, Montclair, N. J., assignor to Ellis-Foster Company, a corporation of New Jersey No Drawing. Application July 7, 1931, Serial No. 549,334

27 Claims. (Cl. 134—26)

This invention in its primary phases relates to chemically altered glyceride oils and/or their fatty acids or a constituent fatty acid particularly unsaturated fatty acids of glycerides, hence containing 12 or more carbon atoms in the acid molecule; specifically tung oil and/or its fatty acids altered to secure different characteristics by reaction with a compound preferably containing the group —CO—CH= or similar or analogous reactive group or bodies generating same, including the quinones such as benzoquinone and naphthoquinone, aldehydes such as acrolein and crotonaldehyde, likewise their corresponding acids, maleic and fumaric acids and anhydrides, itaconic and citraconic acids, maleinanilic acid, cinnamic acid, and the like.

In the companion copending application, Serial No. 555,868, filed August 7, 1931, entitled "Diene type reaction product, etc." there is described and claimed the ammonia derivatives of the reaction products of a drying oil or drying oil acids with acidic compounds containing the —CO—CH= group reactive therewith, while the instant specification is directed to such reaction products and methods of making the same together with their solutions and salts broadly, and alkaline derivatives of such reaction products.

In the following description tung oil and/or its fatty acids will be used to exemplify an unsaturated oil capable of alteration by the foregoing reaction but it should be understood that other analogous reactive raw materials may likewise be employed. These acids (including the oils and fats containing them) are herein designated "oil acids" or "fixed oil acids".

For convenience, therefore, the term "oil acids" will have the meaning ascribed above and the term "reactive unsaturate of oil acid alteration" or "reactive crystallizable acid unsaturate" will be used in making reference to the agent of oil alteration.

The initial unsaturated acid or acids preferably employed herein, for reaction with the oil acids, generally are those having less than 12 carbon atoms (normally from 3 to 10 carbon atoms) when of the aliphatic series, although they may have a larger number of carbon atoms when of the aromatic or cyclic series. Usually and preferably they are crystallizable. Such initial unsaturated aliphatic acids preferably are polybasic, normally being dibasic or tribasic, including maleic, fumaric, itaconic and citraconic acids, and so forth. An extreme degree of unsaturation is represented by the more unstable acetylene dicarboxylic acids.

Of these acids maleic acid which is readily available through methods of oxidation of benzol and the like will be used illustratively herein. Next in order of availability is, perhaps, fumaric acid.

In many cases the anhydrides of such acids or other acid-yielding bodies of an equivalent character are obtainable and in many cases are preferable to the acids themselves. However, in the present application the term "acid" will be considered to comprehend the corresponding anhydride and on the other hand the term "anhydride" will be held to embrace the corresponding acid; all comprehended by the expression resinifying or reactive acid material.

While the preferred form of the primary phase of the invention is concerned with the production of an altered drying oil of the tung oil type and the utilization of such altered tung oil, especially in water-soluble form as later described, in various ways, I wish to call attention to one possible utilization of this altered oil as a raw material in the preparation of a class of resins which are known as "Rezyls".

In several copending applications I have referred to maleic acid or its anhydride and the like in connection with the production of resinous bodies involving reaction between such acid material and a polyhydric alcohol, with or without a modifying agent such as a higher fatty acid (e. g. a fat acid) and the like. Thus in application, Serial No. 609,136, filed December 26, 1922 entitled "Artificial resins from glycerol and the like", there are disclosed polyhydric alcohol-polybasic acid condensation products modified by higher fatty acids and agents accelerating the conversion of the polyhydric alcohol-polybasic acid condensation products into products of decreased solubility and fusibility, the claims of that application being primarily directed to the polyhydric alcohol organic carboxylic acid condensation products containing materials capable of accelerating the conversion of such products into products of decreased fusibility and solubility.

In Serial No. 61,839, filed October 10, 1925, entitled "Resinous products or compositions and process of making same" there are particularly described and claimed products and methods of making same including resinous condensation products of the polyhydric alcohol-polybasic acid type, containing vegetable oils, specifically siccative oils, and acids derived from such oils in combination. Among the acids that may be employed in the production of such complexes as disclosed therein, there may be mentioned maleic and fumaric acids, but these condensation products produced with such materials specifically are not specifically claimed in that application. In application, Serial No. 142,532, filed October 18, 1926, for "Coating compositions comprising a soluble cellulose compound and a protective agent", there is specifically disclosed and claimed coating compositions, such as nitrocellulose-containing compositions, containing protective resins, particularly those of the polyhydric alcohol-polybasic acid type, including fatty acids of the vegetable oils, particularly the siccative oils in combination in such resin complexes. As disclosed therein, polyhydric acids, such as maleic and fumaric acids may be utilized in the production of those complexes for utilization in the coating compositions, but the claims of that application are more particularly directed to the nitrocellulose-containing compositions, and to resins of the polyhydric alcohol-polybasic acid type utilizing pentaerythritol as the polyhydric alcohol. In application, Serial No. 279,216, filed May 19, 1928, for Products consisting of or containing resins, etc., there are particularly described and claimed methods of producing polyhydric alcohol-polybasic acid resins, and the resins themselves in which fatty oils or triglyceride fats or related materials are in chemical combination, the glyceride oils and fats, including the drying oils, such as tung oil, being sensitized by treatment with a sensitization agent prior to the resinification reaction. For example, the drying oils may be resinified by first sensitizing them by treatment with either alcohols or organic carboxylic acids followed by further treatments to produce the resins. Among the polybasic acids utilized as disclosed therein, there may be mentioned phthalic anhydride and equivalent materials. And among the oils that may be treated, there may be included tung oil, linseed oil, etc. The claims are more particularly directed to the products and methods of producing such products involving the sensitized fats or oils utilized in the production of such resins. In Serial No. 425,711, filed February 3, 1930 for Water and resin compositions, there are particularly disclosed and claimed polyhydric alcohol-polybasic acid resins in the form of alkali salts soluble in water. The maleic type materials are not specifically claimed therein.

Substituted polybasic carboxylic acids may be used as resinifying agents and mixed fatty acids of the vegetable oils as modifying agents of resinification of polyhydric alcohols and substituted polybasic carboxylic acids.

Drying oils, if sufficiently well combined, form especially desirable components of resins and other complex products of the present invention. They may be treated by the sensitizing process where the drying oil is first heated with the acid agent before reacting with a polyhydic alcohol to institute resinification.

In the preferred form of the present invention maleic acid is employed with drying oil, especially tung oil, to activate the latter by combining therewith, which activated oil may be used in the cited application as a raw material for the production of resins, but which, in the present application may be used in various other ways, as will be described.

Maleic acid and tung oil as well as the fatty acids of the latter may simply by heating together result in reaction affording an activated tung material serviceable by itself for many purposes and among other utilizations be easily reacted further by treatment with a polyhydric alcohol with or without an added polybasic acid, such as phthalic anhydride, to yield balsams and resins.

Maleic acid may be brought into combination with glycerol and a fat acid, viz., stearic acid.

One phase of the present invention relates to a diverse series of products which are soluble in dilute aqueous alkaline media.

Aside from increased cost the use in coating compositions of volatile inflammable solvents is objectionable in some cases. Products can be obtained by the present synthesis which are soluble in water containing a volatile alkali, e. g. ammonium hydroxide, and when such a solution is applied as a coating the ammonia escapes leaving a surface finish which is well suited for protective or decorative effects. By using alkali-stable pigments or colors in such solution, cold water paints or stains of various shades may be secured.

The synthesis between the oil acids and the reactive unsaturate of oil alteration may be carried ordinarily merely by heating. Thus, tung oil and maleic acid are heated in a manner suitable to activate or sensitize the oil and greatly increase its acidity, reaction taking place with union of the acid and oil, forming an oil containing acid groups which may be regarded as a polybasic acid or anhydride. The locus of coupling with the oil probably is through the conjugated double-bond linkage of the latter, constituting a diene synthesis. Assuming the double bonds at the 9th and 11th carbon atoms of the oil molecule, the opening of the double bond of the maleic group may be expected to form a cyclic body with 6 carbon atoms in the ring, resulting in a derivative of phthalic acid.

The temperature of reaction of this diene synthesis may be varied over quite a range, reaction being slower if the temperature is low. Between 125 and 150° C. some reaction occurs but better results are obtained for most purposes by heating at a temperature above that at which maleic acid becomes the anhydride, or 160° C. and upwards. On the other hand, the maximum temperature to be used in carrying out this reaction when tung oil is the "oil acid" (such acid being in combination as the glyceride) and maleic acid is the reactive crystallizable acid unsaturate, ordinarily does not exceed about 200° C., the range between 150 and 200° C. being suitable, although in some cases higher or lower temperatures may be used. The progress of the reaction may be followed in a rough way by the disappearance of turbidity due to combination of undissolved maleic acid or anhydride. At a temperature near 200° C. this clarification goes on rapidly. The tung polybasic acid anhydride (assuming an adequate proportion of maleic acid has been used) behaves quite differently from the original tung oil, being for one thing, soluble in dilute aqueous alkalies. By proportioning the amount of water, viscous or syrupy solutions result which, as noted, can be applied as coatings; the ammonium compound being, generally speaking, the most suitable. Drying of the coating may be facilitated by baking or stoving the coated article at elevated temperatures. The siccative properties of the tung oil are not altered to such an extent that oxidation-drying is inhibited but baking is recommended for the treatment of metal articles which have had a coating of the aqueous composition.

Additions of modifying substances such as aqueous ammoniacal solutions of shellac or rosin or oxidized rosin may be made. Resins of high acidity of the type made from a polyhydric alcohol and a polybasic acid with or without a monobasic acid which are soluble in aqueous alkaline solutions likewise may be incorporated if desired. These compositions likewise may be used as coating, finishing and polishing agents.

Proteins such as casein or glue also may be introduced as well as gums such as gum arabic, gum acacia and the like.

In a similar manner, starch, soluble starch or flour which have been cooked in water may be incorporated. Pastes, adhesives, paper coating and impregnating material and the like may be made with the soluble maleic derivative alone or with such additions. Viscose may be incorporated and the composition used in a similar way. The viscose, e. g. viscose silk, may carry a waterproofing proportion of the water-soluble oil.

Thus the altered oil of water-soluble characteristics as aforesaid may be incorporated with a great variety of water-soluble or emulsifiable materials.

There follows a series of examples which illustrate reaction between the oil acids (free or combined as in glyceride oils) and the reactive unsaturate of oil acid alteration, specifically a reactive crystallizable acid unsaturate such as maleic acid.

Parts given in the following examples are by weight.

Example 1

A mixture of 30 parts tung oil and 12 parts of maleic acid was heated to 150–200° C. to cause combination. The temperature was then carried to 282° C. at which temperature tung oil alone, of the grade used, will gelatinize in about 8 minutes. Due to the reaction with maleic acid gelatinization did not occur at 282° C. after such heating for 1 hour, the oil merely becoming slightly more viscous. At the end of 1½ hours heating at this temperature no gel had formed, the oil still being fluid when hot. On cooling a viscous, tough mass suggestive of the presence of rubber resulted. This product was soluble in, for example, toluol yielding a very viscous solution. The complex was also soluble in aqueous alkaline media.

It may be noted that maleic acid melts at about 130° C. and starts to change to the anhydride at about 135° C. At 160° C. the conversion to the anhydride is very rapid. The anhydride does not boil until a temperature of 202° C. is reached. So the initial heating if carried out at atmospheric pressure is best conducted at a temperature below 202° C. to avoid loss of maleic acid. Once the acid is "fixed" by entering into combination with the oil the temperature may be raised further. In some cases the heating may be carried out under superatmospheric pressure. As the boiling point of fumaric acid is higher than maleic a correspondingly higher temperature may be used with the former when the reaction is carried out at atmospheric or subatmospheric pressures.

Example 2

A mixture of 10 parts tung oil and 1 part of maleic acid was heated directly to 282° C. and held at this temperature. Gelatinization occurred in 18 minutes as contrasted with 8 minutes for the oil alone, and with the far longer period noted in Example 1 where fixation of the maleic acid first was secured followed by heating the reaction product to 282° C.

Example 3

Tung oil, 100 parts, was heated to 175° C. 40 parts maleic acid were added gradually over a period of ½ hour. This procedure of addition in small portions prevents the excessive foaming which results when the full amount of maleic acid is added all at one time. The temperature was raised to 200° C. and held at this point for one-half hour when the altered oil or tung-maleic oil complex was allowed to cool.

An oil obtained in this way dries to give a clear film instead of the frosted effect which is characteristic of ordinary tung oil. The oil dries more slowly than ordinary tung oil, which suggests coupling between the acids of the glyceride and the maleic acid taking place at one or more of the double bonds of the oil acids. The oil is heavier than water, whereas tung oil is lighter than water. The maleic acid cannot be extracted by boiling the product with water. The oil is soluble in aqueous alkalies. The oil reacts readily with glycerol forming a complex which polymerizes quickly on further heating. The oil does not gelatinize as does tung oil. Neither maleic acid nor the anhydride is soluble to more than a slight degree in tung oil at ordinary temperatures.

When a mixture of maleic acid and tung oil is heated the acid first melts to form a lower phase. If this is vigorously stirred into the oil and the mixture cooled as rapidly as possible, practically all of the maleic acid crystallizes out. However, if the mixture is heated for a sufficient time above about 135° C. the oil when cool is clear. The phases have disappeared. These observations are indicative of the formation of a definite complex when maleic acid and tung (China-wood oil) are heated together.

Example 4

Soya bean oil was heated to 130° C. and 10 per cent of maleic acid added gradually, the temperature then being carried to 200° C. On heating to a temperature somewhat below 100° C. and washing with a 5 per cent aqueous solution of sodium bicarbonate an upper layer separated as an emulsion, the lower aqueous layer being opalescent. On acidification of this layer no oil separated.

When a mixture of 9 parts soya bean oil and 1 part tung oil was similarly treated the acidification of the aqueous layer caused separation of an oil representing the tung maleic oil complex formed by the reaction. This procedure provides a method of separating dissimilar oils or components of reactive characteristics.

Fish oil is more reactive than soya bean oil but does not couple with maleic anhydride as readily as tung oil.

Example 5

The tung maleic oil complex dissolves in aqueous solutions of triethanolamine giving solutions which, even though turbid, will dry in thin layers to give a clear, somewhat sticky film.

When, however, the tung maleic oil complex and triethanolamine are mixed in the substantial absence of water different results are obtained.

10 parts of the tung maleic oil complex and 2.7 parts triethanolamine were stirred together. The amine and oil were miscible. In less than 1 minute the temperature rose and a slighly sticky rubbery substance formed. This was not soluble in water although swelling therein. The amount of amine used in this case was half the amount required to combine with "maleic" group of the oil complex.

The proportion of the amine then was doubled to provide sufficient thereof to combine with the acid group fully, the temperature being raised to 50° C. to assist combination. This product was a very viscous liquid soluble in water.

Example 6

10 parts of the tung maleic oil complex were stirred with 3.5 parts of aniline. A clear solution resulted which heated spontaneously to some extent and increased in viscosity. Heat then was applied and the temperature raised to 100° C. to complete the reaction. When cold the product was a clear heavy balsam. Applied as a coating hardening took place over night despite the absence of driers. A tough film resulted. Driers such as a cobalt compound could be added to quicken the drying. This aniline reaction product is insoluble in water.

A harder product is obtained with naphthylamine. 10 parts tung maleic oil complex and 2.8 parts alpha naphthylamine were heated together to 140° C. The viscosity increased and when cool the product was a flexible, slightly tacky resin. It is soluble in toluol, insoluble in alcohol and acetone.

Example 7

Aqueous ammoniacal solutions of the tung maleic oil complex were tested for compatibility with various water-soluble substances. It was found to be compatible with glue or gelatine, glycerol, ethylene glycol, diethylene glycol or carbitol and the like. Albumin could not be incorporated as readily.

10 parts of the tung maleic oil complex and a like amount of casein, 7 parts concentrated ammonium hydroxide solution and 73 parts water were mixed giving a thick cloudy solution. Applied as a coating the layer dried over night to a clear hard and tough film.

Example 8

Solutions were made in dilute ammonia water of (1) congo resin (2) shellac, and (3) rosin which had been oxidized by gently heating the powdered material in air for some time. These solutions were separately mixed with an ammoniacal aqueous solution of the tung maleic oil complex. Each of the compositions so made gave clear films when dried on glass. The resins increased the hardness of the film over that normal to the oil complex itself.

Similarly mixtures of resin solutions such as a mixture of (1) and (3) or (2) and (3) may be incorporated with the oil complex in various proportions, e. g. 1:1; 1:2; 1:3; 1:4 and in these proportions reversed.

Example 9

Aqueous alkaline solutions of resins of the Rezyl type made by reaction between a polyhydric alcohol, a polybasic acid and another modifying acid likewise may be incorporated with aqueous solutions of the tung maleic oil complex.

A commercial grade of Rezyl (known as Rezyl T-2 water-soluble) was dissolved in ammonia water and the solution added to an ammoniacal solution of the tung maleic oil compound. Approximately equal proportions of the resin and the oil were used. Thin films when dry were transparent. Baking of the film at 100° C. hardened it and improved its clarity.

Example 10

A 20 per cent aqueous solution of the tung maleic oil compound was made using ammonium hydroxide as the alkali. Thin copper wire was passed through this solution and then through an aperture slightly larger than the wire, so as to leave on the wire a thin uniform film of the solution. The wire then was baked at 80° C. thereby forming an adherent and flexible insulating coating over its surface.

Example 11

10 parts of the tung maleic oil compound were heated slowly with 1 part of glycerol. The latter dissolved in the oil at about 170° C. and water vapor started to come off in the neighborhood of 175° C. The viscosity began to increase at 225° C. and a sample was removed at a temperature between 225° and 228° C. When cold this was somewhat elastic. It was soluble in toluol. The solution applied as a coating dried over night giving a tough film free from tackiness. The addition of cobalt drier accelerated the drying of the film.

The remainder of the batch after removal of the sample at about 228° C. was heated further. A polymerized insoluble resinous mass formed at about 230° C. The soluble product had therefore been removed just prior to the initiation of insolubility.

From the maleinized tung oil which to all intents and purposes may be regarded as a polybasic acid there may be formed salts of inorganic bases as well as those of organic bases. Moreover these salts may be neutral, basic or acid. Also one acid group may be neutralized by a water-soluble base, a second acid group by a base forming a water-insoluble salt. One or more of the acid groups may be combined with an oxide of lead, manganese and/or cobalt to secure a self-contained drier, designated an integral drying catalyst.

A salt of such polybasic drying oil whether water-soluble or organic-solvent-soluble may be used to form coatings, air-dried and/or baked on articles of the group of materials comprising metal, wood and paper. The water-soluble maleinized tung oils are proposed for use (among other applications) as a baked coating for covering the interior of tin cans used in the packaging of food-stuffs of the canned or "tinned goods" type.

Another quite dissimilar use of the maleinized oil is to treat it with a polyhydric alcohol such as glycerol, as illustrated, to form solid products, e. g. resins and plastics. An intermediate stage of resinification produces balsamic products. Hence the maleinized oil may, in one phase of the invention, be utilized as a polybasic acid providing a raw material for the production of resins of the polybasic acid-polyhydric alcohol type. This means that it may be reacted with glycerol, glycol and the like with or without other polybasic acids such as phthalic anhydride, succinic acid and so forth, further with or without a monobasic acid such as oleic, benzoic, salicylic, stearic, cottonseed fatty acids, linolic, linolenic acids, and the free acids of normal tung oil particularly for the purpose of obtaining resins soluble in organic solvents which may be as siccative or non-siccative components of coating compositions, in which the resin may perform the office of the sole binding and film-forming agent or may be used with supplemental film-formers such as nitrocellulose, cellulose acetate and other cellulose esters, ethers and analogous soluble cellulose bodies.

Example 12

100 parts tung oil and 50 parts phthalic anhydride were heated to about 250° C. and of this mixture 60 parts were treated with 16 parts maleic acid. The temperature was carried ultimately to 250° C., then cooled to 200° C. and 17 parts glycerol added. The glycerol dissolved on heating a few minutes at 200° C. The temperature was raised to 210° C. and held at this point for ¾ hour. The product was quite viscous when hot and when cold was a soft rubbery mass soluble in toluol and butyl acetate. The acid number was 110. On heating for a period of 1 hour instead of ¾ hour the product is no longer soluble.

Example 13

Solutions of soluble maleinized tung oil and of cellulose acetate in acetone were separately prepared and mixed to give a proportion of 1 part of the tung compound to 10 parts of cellulose acetate. Clear films were obtained on drying.

Example 14

Glycerol is compatible with maleinized tung oil in aqueous ammoniacal solution and as illustrated in the foregoing will react on heating to give an insoluble body. The following shows that this reaction can be brought about in thin layers which form coatings. 10 parts maleinized tung oil 1 part glycerol 36 parts water and 4 parts concentrated aqueous ammonium hydroxide were mixed to form a solution which was applied to a metal panel and allowed to air-dry for one-half hour. A clear tacky film was formed which was baked for 7 hours at 90° C. thereby causing the glycerol to react in situ with the maleinized tung oil.

Example 15

Maleinized tung oil and resorcin, heated with a small quantity of sulphuric acid, to 200° C., gave a product which dissolved in ammonia water to give a fluorescent solution, the two colors being bright green and brown.

Example 16

10 parts maleinized tung oil were dissolved in a dilute aqueous solution of sodium hydroxide (1½%). Calcium chloride sufficient to form the normal salt of the maleic radicle was added forming a whitish voluminous precipitate. On drying the product is insoluble although swelling somewhat in toluol. It is insoluble in tung oil.

Example 17

20 parts of maleinized tung oil and 1.3 parts calcium hydroxide were heated to 250° C. for ½ hour. This amount of calcium hydroxide represents one-half the proportion of calcium used in the preceding example and is just sufficient to form a half-acid salt of the maleic radicle. Most of the calcium hydroxide went into solution. The limed maleinized tung oil was considerably more viscous, when cool than the unlimed. 20 parts of rosin were added and heating resumed at 250° C. The residue of undissolved calcium hydroxide went into solution. 1/10 part of cobalt acetate was added and the melt heated for ¼ hour at 250° C., then cooled to 200° C. and thinned with 35 parts mineral spirits (Varnolene). A heavy-bodied dark colored varnish was obtained which remained clear on standing 24 hours indicating that the calcium and cobalt compounds were in solution.

Maleinized tung oil containing an integral drying catalyst such as cobalt, lead or manganese, tung-maleate thus may be prepared including various mixed driers and mixed salts based on the coupling of one carboxyl group with one base and combining a second base with a second carboxyl group when a dibasic coupling acid of the character of maleic acid is used. When the acid is tribasic or contains a still higher number of carboxyl groups or equivalent anhydride groups the salts which may be formed may be still more complex.

The salts of the maleinized tung oil or tung-maleates therefore may be of a water-soluble or a water-insoluble character, all such tung-maleates being comprised under the term Ellisol; this invention relating to Ellisol and process of making same, involving in its specific aspects the reaction between tung oil or its acids and maleic, fumaric acids and anhydrides, and the like, or substances generating reactive acids of this character; still more specifically dibasic acids containing the group —CO—CH=, as well as acids capable of generating products containing this group such as may be secured by heating malic and citric acids, and the like: the resulting tung compound with the acidic coupling body being treated with one or more bases to form various compounds thereof, such salts being united principally through the carboxyl of the acidic coupling compound rather than through any saponification of the tung oil material itself. (The term tung oil material is used herein to include glyceride oils and their acids of the reactive character represented by tung oil, that is China-wood oil).

The term "maleinized" is utilized herein to cover treatment with maleic acid or anhydride, or materials generating such substances to form a reaction product containing maleic acid or anhydride, or the corresponding groups in combination with the substance treated.

The term "Rezyl" is used herein to cover polyhydric alcohol-polybasic acid type condensation products, particularly resinous in character containing modifying ingredients particularly those of the fatty oils and acids derived by hydrolysis from the fatty oils.

The term "unsaturate" is used herein to cover a compound containing an unsaturated group in its molecule.

What I claim is:

1. An aqueous alkaline solution of a tung oil compound containing the maleic acid radicle.

2. A solution according to claim 1 in which the alkali is volatile.

3. A solution according to claim 1 in which the alkali is ammonia.

4. A salt of a tung oil compound containing the maleic acid radicle.

5. A water-soluble salt of a tung oil compound containing the maleic acid radicle.

6. A salt of a drying oil reaction product with a polybasic acid, soluble in water.

7. The product of reaction of a tung oil compound containing the maleic acid radicle and a polyhydric alcohol.

8. A tung oil compound containing the maleic acid radicle containing a drying catalyst combined with the tung oil compound.

9. Process of making a reaction product which comprises reacting on tung oil material with an acidic coupling compound containing the

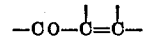

group to form a reaction product and forming a salt of said reaction product.

10. An aqueous alkaline solution of the reaction product of a drying oil and an acidic compound containing the

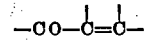

group reactive therewith.

11. An amino reaction product of an aqueous alkaline solution of the reaction product of a drying oil and an acidic compound containing the

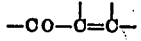

group reactive therewith.

12. An aqueous alkaline solution of the reaction product of drying oil acids and an acidic compound containing the

reactive therewith.

13. A reaction product of a drying oil and a compound selected from the group of maleic acid, fumaric acid, maleic anhydride, fumaric anhydride, itaconic acid, citraconic acid, maleinanilic acid, cinnamic acid, acrolein, crotonaldehyde, benzoquinone and naphthoquinone.

14. A reaction product of drying oil acids and a compound selected from the group of maleic acid, fumaric acid, maleic anhydride, fumaric anhydride, itaconic acid, citraconic acid, maleinanilic acid, cinnamic acid, acrolein, crotonaldehyde, benzoquinone and naphthoquinone.

15. A reaction product of tung oil and maleic acid consisting of an oil that is heavier than water, from which the maleic acid cannot be extracted by boiling with water, which oil dries more slowly than ordinary tung oil, and which oil is soluble in aqueous alkalies, said oil drying to give a clear film.

16. A reaction product of tung oil maleic acid and triethanolamin.

17. The process of forming reaction products which comprises reacting on tung oil material with an acidic compound containing the

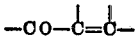

group reactive therewith, at temperatures between 125° C. and the boiling point of the compound containing the

group.

18. The process of producing a reaction product which comprises reacting on tung oil with an acidic coupling compound containing the

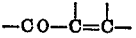

group at temperatures between 135° C. and the boiling point of the compound containing the

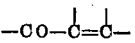

group.

19. The process of making a reaction product which comprises reacting on tung oil acids with an acidic coupling compound containing the

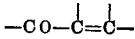

group at temperatures between 135 and 200° C. to form an oil-type reaction product having drying properties.

20. The process of forming reaction products which comprises reacting on tung oil material with a compound which on heating at temperatures above 125° C. generates an acid compound containing the

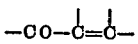

group reactive therewith, at temperatures between 125° C. and the boiling point of the compound containing the

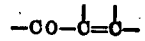

group.

21. The process of forming reaction products which comprises reacting on tung oil acids with a compound which on heating at temperatures above 125° C. generates and acid compound containing the

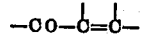

group reactive therewith, at temperatures between 125° C. and the boiling point of the compound containing the

group.

22. The process of forming reaction products which comprises reacting on drying oil material with a compound which on heating at temperatures above 125° C. generates an acid compound containing the

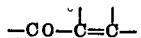

group reactive therewith, at temperatures between 125° C. and the boiling point of the compound containing the

group.

23. The process of forming reaction products which comprises reacting on drying oil acids with a compound which on heating at temperatures above 125° C. generates an acid compound containing the

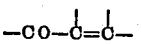

group reactive therewith, at temperatures between 125° C. and the boiling point of the compound containing the

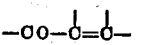

group.

24. A coating composition containing a reaction product of a drying oil and a compound selected from the group of maleic acid, fumaric acid, maleic anhydride, fumaric anhydride, itaconic acid, citraconic acid, maleinanilic acid, cinnamic acid, acrolein, crotonaldehyde, benzoquinone and naphthoquinone.

25. A coating composition containing a reaction product of drying oil acids and a compound selected from the group of maleic acid, fumaric acid, maleic anhydride, fumaric anhydride, itaconic acid, citraconic acid, maleinanilic acid, cinnamic acid, acrolein, crotonaldehyde, benzoquinone and naphthoquinone.

26. A coating composition containing the reaction product of a drying oil and an acidic compound containing the

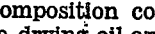

group reactive therewith.

27. A coating composition containing the reaction product of tung oil material with an acidic compound containing the

reactive therewith.

CARLETON ELLIS.

CERTIFICATE OF CORRECTION.

Patent No. 2,033,131.  March 10, 1936.

CARLETON ELLIS.

It is hereby certified that error appears in the printed specification of the above numbered patent requiring correction as follows: Page 3, second column, line 61, for "slighly" read slightly; page 5, first column, line 22, insert a comma after "oil" and after "glycerol"; page 6, second column, line 9, claim 21, for "and" read an; and line 72, claim 27, before "reactive" insert group; and that the said Letters Patent should be read with these corrections therein that the same may conform to the record of the case in the Patent Office.

Signed and sealed this 12th day of January, A. D. 1937.

Henry Van Arsdale
Acting Commissioner of Patents.

(Seal)